(12) United States Patent
Van Den Wildenberg (10) Patent No.: US 10,405,496 B2
(45) Date of Patent: Sep. 10, 2019

(54) OPEN THROAT INTAKE FOR A BALER

(71) Applicant: Kuhn-Geldrop BV, Geldrop (NL)

(72) Inventor: Leonardus Johannes Van Den Wildenberg, Budel (NL)

(73) Assignee: Kuhn-Geldrop BV, Geldrop (NL)

( * ) Notice: Subject to any disclaimer, the term of this patent is extended or adjusted under 35 U.S.C. 154(b) by 71 days.

(21) Appl. No.: 15/031,552

(22) PCT Filed: Oct. 21, 2014

(86) PCT No.: PCT/EP2014/072563
§ 371 (c)(1),
(2) Date: Apr. 22, 2016

(87) PCT Pub. No.: WO2015/059149
PCT Pub. Date: Apr. 30, 2015

(65) Prior Publication Data
US 2016/0270298 A1 Sep. 22, 2016

(30) Foreign Application Priority Data
Oct. 24, 2013 (GB) .................................. 1318806.5

(51) Int. Cl.
*A01F 15/10* (2006.01)
*A01F 15/07* (2006.01)
*A01F 15/18* (2006.01)

(52) U.S. Cl.
CPC ............ *A01F 15/106* (2013.01); *A01F 15/07* (2013.01); *A01F 15/10* (2013.01); *A01F 15/18* (2013.01); *A01F 2015/077* (2013.01)

(58) Field of Classification Search
CPC ........ A01F 15/106; A01F 15/07; A01F 15/10; A01F 15/18; A01F 2015/077
See application file for complete search history.

(56) References Cited

U.S. PATENT DOCUMENTS 3,412,535 A 11/1968 Drummond
3,780,506 A 12/1973 Tashiro
(Continued)

FOREIGN PATENT DOCUMENTS

DE 1141125 B * 12/1962 ............. A01F 15/10
DE 3426965 A1 1/1986
(Continued)

OTHER PUBLICATIONS

US 5,846,523 A, 12/1998, Engel et al. (withdrawn)
(Continued)

*Primary Examiner* — Robert E Pezzuto
*Assistant Examiner* — Adam J Behrens
(74) *Attorney, Agent, or Firm* — Oblon, McClelland, Maier & Neustadt, L.L.P.

(57) ABSTRACT

An open throat intake for a baler, includes a pickup unit with tines for picking up crop material from the ground and carrying the crop material towards a lower roller located across a baler inlet. Above the lower roller is an upper roller both of which include auger fighting on outward sides thereof, which can overlap with the inlet. In use the contra-rotating flightings, by cooperation with a retainer plate, urge material carried from outside edges of the pick up unit toward the baler inlet which is generally narrower than the pick up unit. Gripping ribs provide a compressive in-feed function when large volumes of material are to be processed.

17 Claims, 5 Drawing Sheets

(56) References Cited

U.S. PATENT DOCUMENTS

| | | | | |
|---|---|---|---|---|
| 4,121,513 | A * | 10/1978 | Kopaska | A01F 15/07 100/88 |
| 4,637,201 | A | 1/1987 | Pruitt et al. | |
| 5,595,055 | A * | 1/1997 | Horchler, Jr. | A01D 90/02 100/88 |
| 5,848,523 | A * | 12/1998 | Engel | A01D 89/008 100/88 |
| 5,941,168 | A * | 8/1999 | Kluver | A01F 15/07 100/87 |
| 6,016,645 | A * | 1/2000 | Voss | A01F 15/106 100/88 |
| 6,279,304 | B1 * | 8/2001 | Anstey | A01F 15/106 198/676 |
| 6,601,375 | B1 * | 8/2003 | Grahl | A01D 89/006 56/16.6 |
| 6,655,121 | B1 * | 12/2003 | Viesselmann | A01F 15/106 100/88 |
| 6,679,042 | B1 * | 1/2004 | Schrag | A01F 15/10 56/341 |
| 6,948,300 | B1 * | 9/2005 | Bandstra | A01D 89/008 56/119 |
| 8,037,814 | B1 | 10/2011 | Smith | |
| 8,056,314 | B1 * | 11/2011 | Anstey | A01F 15/106 56/364 |
| 8,156,723 | B1 * | 4/2012 | McClure | A01D 89/002 56/341 |
| 8,240,117 | B1 * | 8/2012 | McClure | A01D 89/008 56/341 |
| 2002/0095925 | A1 * | 7/2002 | Preheim | A01F 15/106 56/341 |
| 2004/0083704 | A1 * | 5/2004 | Lucand | A01F 15/106 56/341 |
| 2006/0005522 | A1 * | 1/2006 | Pargmann | A01D 90/04 56/341 |
| 2008/0163601 | A1 * | 7/2008 | Graber | A01D 89/005 56/341 |
| 2010/0071339 | A1 * | 3/2010 | Viaud | A01D 90/04 56/341 |
| 2010/0242427 | A1 * | 9/2010 | Anstey | A01D 89/008 56/341 |
| 2012/0159918 | A1 * | 6/2012 | McClure | A01D 89/008 56/341 |
| 2013/0000496 | A1 * | 1/2013 | Posselius | A01F 15/0825 100/40 |
| 2013/0167497 | A1 * | 7/2013 | Van De Weijer | A01D 90/04 56/341 |

FOREIGN PATENT DOCUMENTS

| | | | |
|---|---|---|---|
| DE | 40 25 467 A1 | 2/1992 | |
| DE | 19806630 C2 * | 6/2002 | A01D 90/04 |
| EP | 0064112 B1 * | 11/1984 | A01D 89/008 |
| EP | 2 143 469 A | 2/1985 | |
| EP | 0 254 337 A1 | 1/1988 | |
| EP | 0286776 A1 * | 10/1988 | A01D 89/008 |
| EP | 0470356 A2 * | 2/1992 | A01F 15/106 |
| EP | 0 681 782 A1 | 11/1995 | |
| EP | 1 252 814 A1 | 10/2002 | |
| EP | 1413191 A1 * | 4/2004 | A01F 15/106 |
| EP | 1800534 A1 * | 6/2007 | A01D 90/04 |
| EP | 2 269 440 A1 | 1/2011 | |
| JP | 61-37028 A | 2/1986 | |
| JP | 2006-50929 A | 2/2006 | |
| JP | 2013-9655 A | 1/2013 | |

OTHER PUBLICATIONS

International Search Report and Written Opinion dated Dec. 4, 2014 in PCT/EP2014/072563 filed Oct. 21, 2014.
Search Report dated Apr. 10, 2014 in United Kingdom Patent Application No. GB1316806.5.
Office Action dated Oct. 26, 2018 in Japanese Patent Application No. 2016-526224, citing documents AO-AQ therein, 5 pages (submitting English translation only).

* cited by examiner

OPEN THROAT INTAKE FOR A BALER

TECHNICAL FIELD

The present invention relates to an intake unit for a baler of the type known as an "open throat pick-up" used to collect crop material for feeding into a baler apparatus. The invention is particularly applicable where an inlet of the baler is narrower than the swath or windrow to be collected from the ground, such that the pickup function must also direct material at the outside edges toward the inlet of the baler.

BACKGROUND TO THE INVENTION

An intake unit for a baler is known as "open throat" where the opening from the pick up towards the inlet of the baler is open, and there are no devices present to forward the material towards the inlet of the baler, whereby the elements of these devices substantially "close" the surface of the inlet of the baler to ensure forwarding (and possibly cutting/ processing) all of the material, i.e. an "undershot" rotor with tines.

In general, the purpose of a wide pickup baler is to collect crop material to be formed into a bale from a swath or windrow on the ground and to convey this material toward the inlet of the baler. Since swaths/windrows are typically wider than the inlet of the baler, and all material must be collected in a single pass, accordingly the pickup unit (that typically includes a series of radially extending rotating tines that extend into and "pick up" the crop material) is wider, e.g. 2 m, than the inlet of the baler, e.g. 1.2 m.

In such an arrangement the material collected at the outermost edges of the pickup unit must be directed/channelled transverse to the general direction of travel toward the inlet of the baler. If no provision is made for specifically directing crop material from the edges of the pickup toward the inlet then material will build up at the edges, ultimately leading to blockage of the material flow.

In an effort to address this problem U.S. Pat. No. 6,948, 300 describes a pickup system where crop material is able to be transported sideways by the use of two pairs of augers positioned above the pickup and outside of the inlet. Crop material that is otherwise at the edge and outside the baler inlet is urged by the augers toward the inlet. However, this apparatus has the disadvantage that material must be transported over the pickup strippers which is not a smooth surface. Build up and blockage can occur as a result.

U.S. Pat. No. 5,848,523 describes the use of an additional "overshot" roller that extends all the way across the pickup, prior to the baler inlet. The outer ends of the roller include auger flightings in an appropriate pitch direction depending on rotation. Crop material is accordingly transported sideways over the auger toward the inlet, further urged by surface constructions on the inboard portion of the overshot roller. However, a disadvantage of this solution is that when a large volume of material is required to be processed, the auger does not have sufficient power to move the material quickly enough towards the inlet, causing blockages and a subsequent failure to pick up the full width of a swath or windrow.

U.S. Pat. No. 6,601,375 suggests an improvement over U.S. Pat. No. 5,848,523 by including a second pair of augers above the overshot roller auger sections. These augers (above and below) do not have retainer plates, but cooperate with each other to pinch the material and draw it forward into the direction of the inlet. However, while effective in low volume applications, if the material flow on the sides is high then a significant amount of material will be disposed on the outside edges of the baler inlet, resulting in an inconsistent density and size of the bale at the edges, compared to the centre. Furthermore, if yet larger volumes of material are required to be processed toward the inlet, together with already large volumes coming directly into the inlet from the pickup, then the total volume can cause a self-supporting blockage of crop material across the inlet. In effect, the required interaction of the augers limits the maximum volume.

SUMMARY OF THE INVENTION

The present invention seeks to mitigate the known problems experienced in the prior art or, at least, provide a useful alternative intake for a baler.

In one broad aspect the invention provides an open throat intake for a baler according to claim 1, including a pickup for supplying crop material to a baler inlet, wherein the pickup is wider than at least one side of the baler inlet; a first (or "lower") roller member downstream of the pickup and extending at least across the baler inlet; and a second (or "upper") roller extending at least across the baler inlet and located above the first roller; wherein both the first and second rollers include auger flightings on outward ends.

In practice the upper roller, with an auger portion at both outboard ends, rotates in a contrary direction to the lower (first) roller.

Preferably the upper roller is spaced apart from the lower roller such that, at least, the auger flightings on the respective roller surfaces (above and below) do not overlap with one another, when viewed in an axial direction of the rollers. In a preferred embodiment the upper and lower rollers are spaced apart by at least a half, but preferably a whole, diameter of one of the rollers and/or the roller with flighting diameter such that there is sufficient free space to provide an opening in the working position. In practice the gap/opening between rollers is between about 15 and 30 cm, optimally about 20 cm.

In operation the rollers are spaced at a fixed position from each other such that during "normal" operating volumes of crop material the flow does not necessarily contact the upper roller, or only makes minimal, non-compressive, contact. In such cases, crop material is urged only by the lower roller auger surface towards the inlet. At low/normal volumes, there is little risk of misshapen bales or blockages. Particularly, during lower volumes of operation the lower augers/ first roller will give an even filling over the width of the baler inlet resulting in bale of good shape and equal density.

In the event of larger volumes of material required to be processed, such material has the tendency to build up on the outside edges of the pickup until it reaches the upper roller surface and is pressed downward and thereby urged toward the baler inlet. That is, at least by the flightings of the lower roller, or in the case of flightings on the upper rollers too, by both flightings.

Preferably, each auger surface is associated with a retainer plate to assist with the inward directional movement of crop material. Furthermore, it is preferable that at least one of the rollers has a gripping inboard contact surface which is able to compress the large volume of crop material (from both the side and the front) which compresses and moves material forward toward the inlet. This feature is especially important with big volumes of material in open throat balers since these type of baler require the material to be pushed toward the inlet in order to prevent plugging and support rotation of the bale in the baling chamber.

Preferably the outboard auger surface of at least the upper roller extends to overlap with the baler inlet. Such a feature avoids large deposits directly at the side of the inlet, but, instead, allows for more even distribution of material into the inlet, thereby avoiding inconsistent bale densities at the outer edge and non-cylindrical bale shapes.

Preferably the upper roller is connected directly to a frame of the baler, rather than connected directly with the pickup unit. However, the connection may be adjustable in order to change the gap between rollers when the machine is stopped. Such an adjustment may be needed when there is a change in the material to be baled. This configuration enables the driveline components to be more simple and, furthermore, the opening height between the rollers can be adjusted dependent on use requirements.

Preferably the lower roller is mounted with the pickup unit so as to be in an optimal position for the best flow of material.

DESCRIPTION OF AN EXAMPLE OF THE INVENTION

Figure 1:
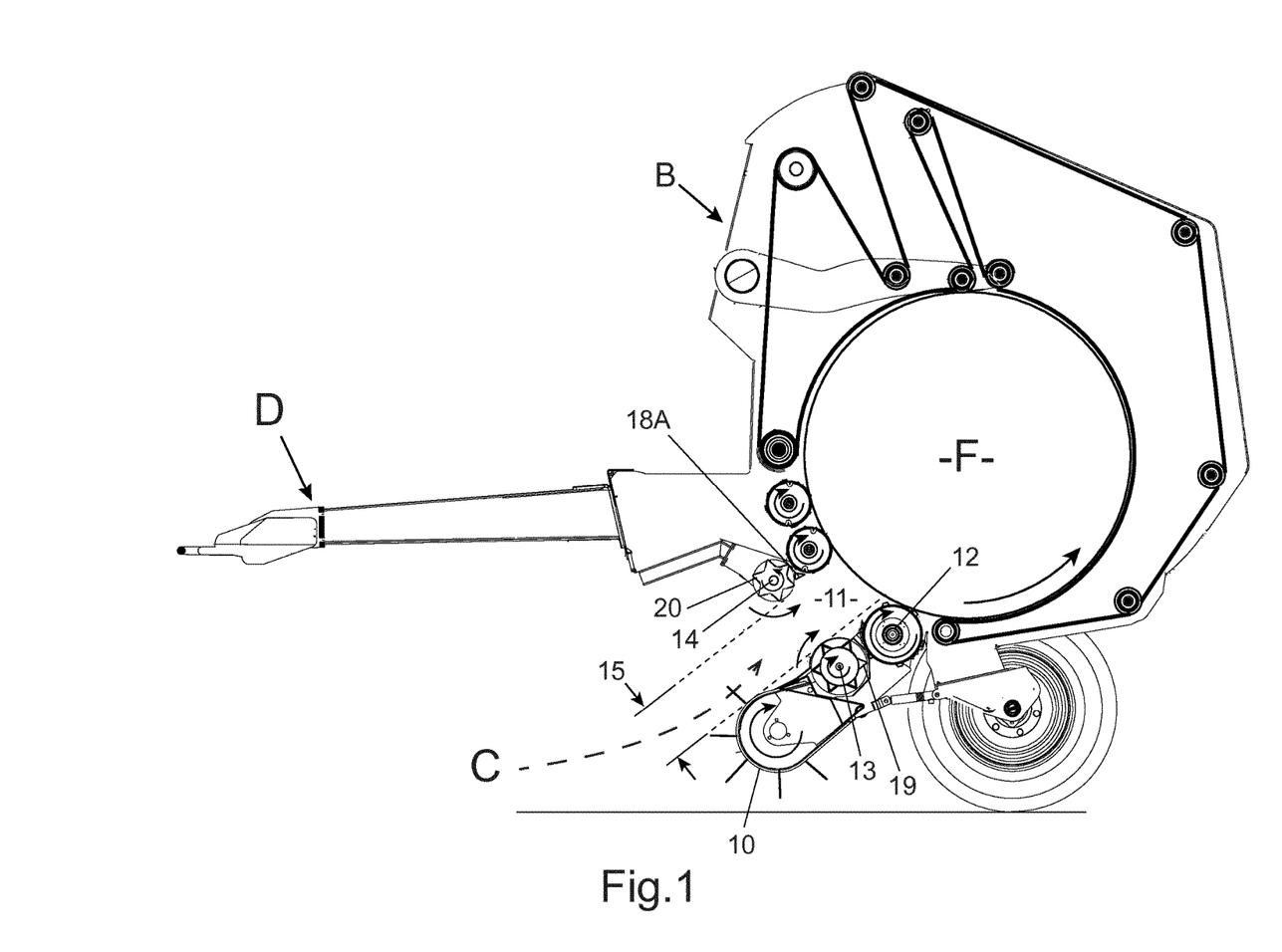
FIG. 1 illustrates a side view of a baler incorporating an open throat intake according to the invention.

FIG. 1 illustrates a round baler apparatus B which comprises a bale forming chamber F and a pickup unit 10, typically hitched to a tractor or like vehicle by a drawbar D. Conventional round baler are well known from, for instance, EP2269440, U.S. Pat. No. 8,037,814 and GB2143469.

These balers gather agricultural crop material from the ground with a pick up mechanism and the material is forwarded to a bale chamber that compresses the material to form a round bale. After compression the bale is wrapped with binding material, for example netting, twine or film, to keep the material under pressure and to maintain its shape. After binding the bale is ejected from the bale chamber.

Balers can be of various types including fixed chamber balers that produce a bale of a fixed diameter, and variable chamber balers which can produce bales of different diameters. The variable chamber balers usually make use of a set of endless belts running over rollers as in the prior art mentioned above. The present invention potentially relates to all types of open throat baler.

Figure 3:
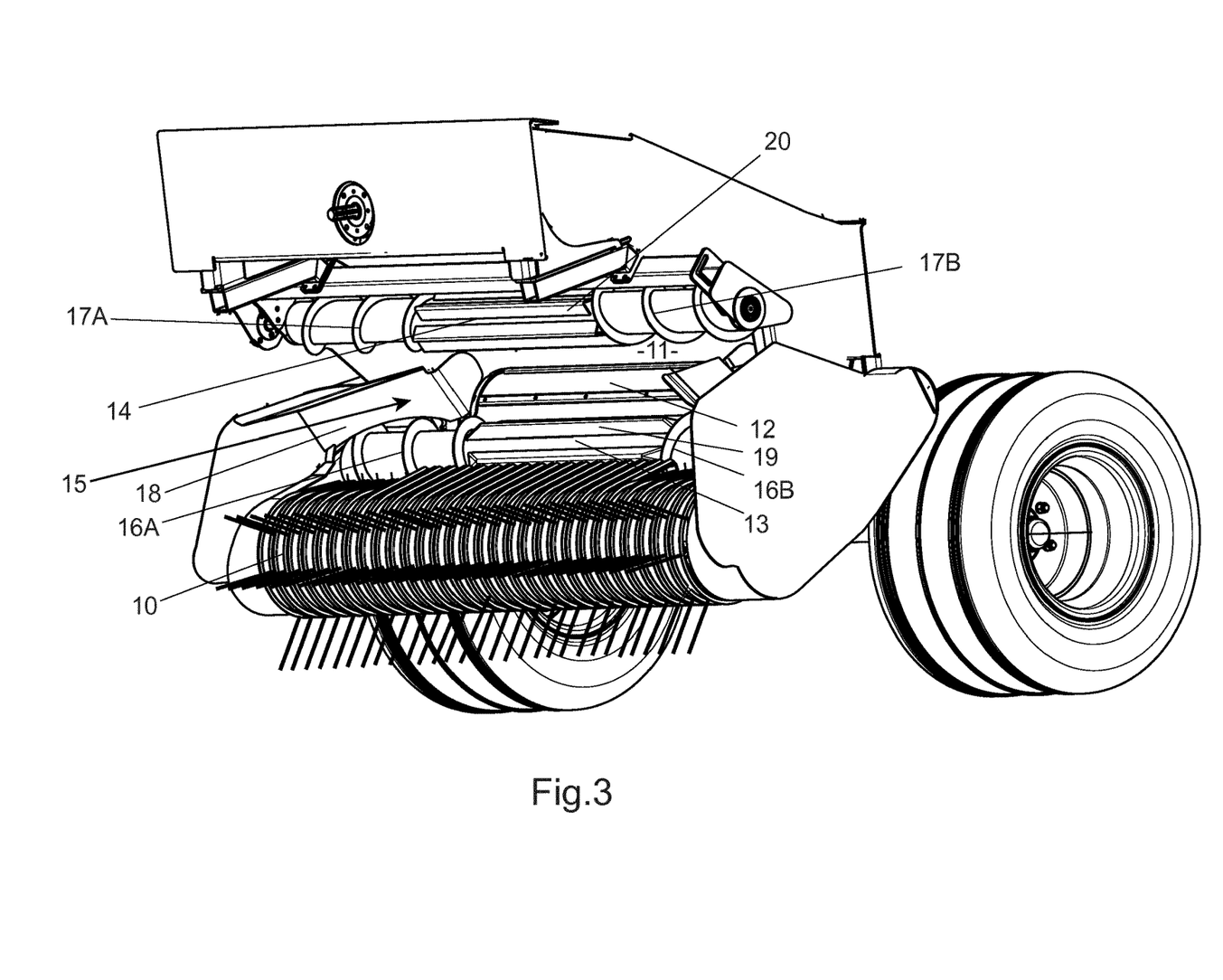
FIG. 3 illustrates a general perspective view of an open throat pickup feeder according to the invention, located at the inlet of a baler.

FIG. 3 best illustrates the general configuration of components for a pickup feeder according to the invention. Specifically, a pickup unit 10 is shown which is lowered to engage with crop material on a ground surface in the conventional way. Material is intended to be picked up and carried toward a baler inlet 11 which is defined by an infeed roller 12. The general configuration according to the illustrated embodiment is an open-throat round baler device, i.e. which produces a round/cylindrical type bale. Furthermore, the pickup unit 10 is clearly wider, evenly on each side, than the infeed roller 12.

According to the invention, the feeder includes a first or lower roller 13 located downstream of and behind the pickup unit 10, but prior to the baler inlet/infeed roller 12. Furthermore, a second or upper roller 14 is located, spaced apart and above the lower roller 13 such that an opening 15 is present prior to the baler inlet 11. Preferably both rollers 13 and 14 are approximately equal to the width of the pickup unit 10. In the preferred form of the invention roller 14 is above but offset forward of roller 13 as is best shown by FIG. 1.

Figure 2:
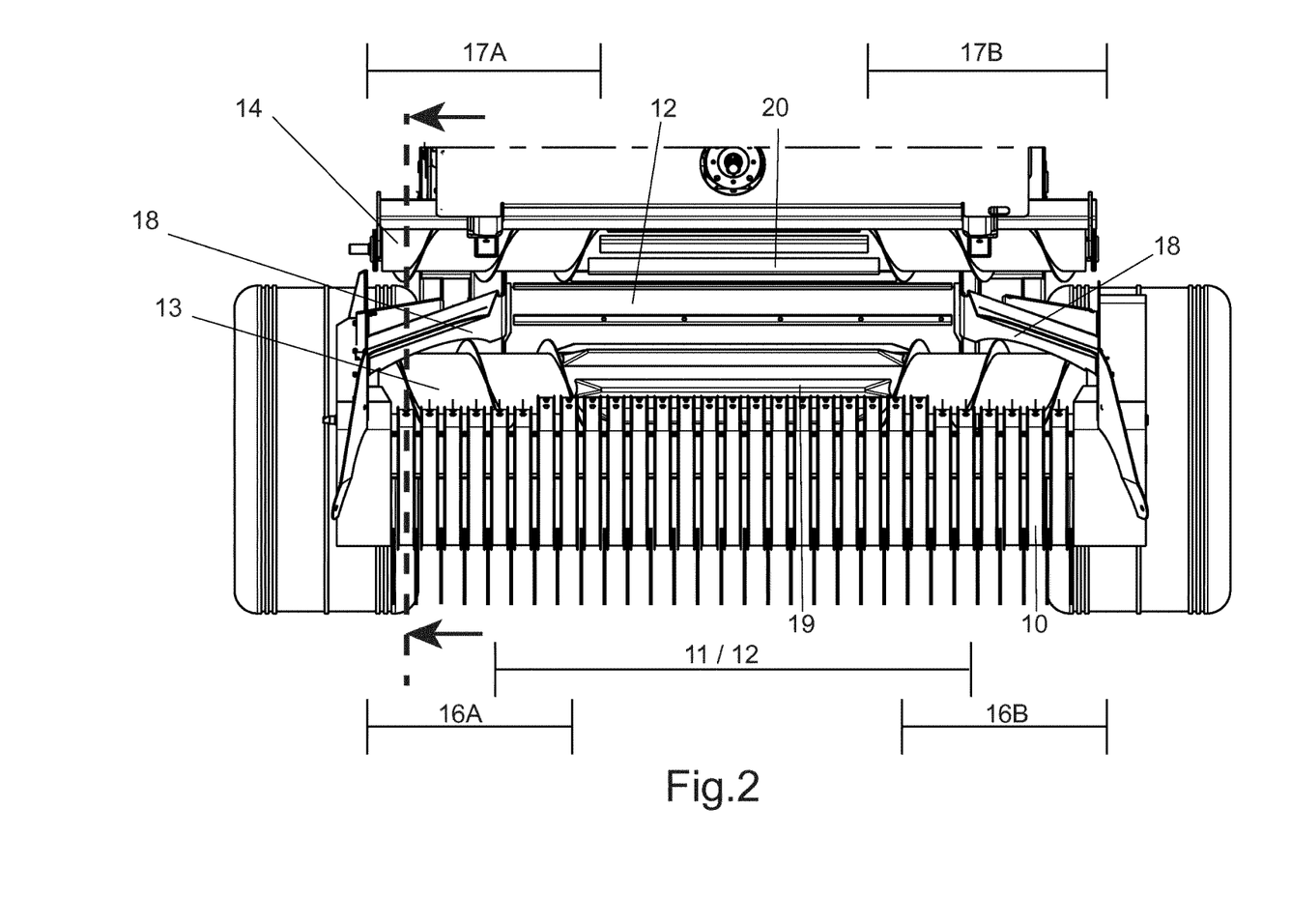
FIG. 2 illustrates a front view of the open throat intake according to the invention.

Both of the lower and upper rollers 13, 14 include an auger flighted portion at the outside ends thereof. From the perspective of the FIG. 2 illustration, the auger portions are designated 16A/16B for the left and right sides of the first roller 13 respectively and 17A/17B for the left and right sides of the second roller 14 respectively. FIG. 2 shows the relative widths of these auger portions compared to the inlet 11 and the desired urging direction for crop material that comes into contact therewith.

According to the illustrated configuration, auger portions 16A and 17B are "right handed" screw threads which will urge crop material in contact therewith in a direction towards the inlet. Auger portions 16B and 17A, on the contrary, are left handed screw threads, but also urge crop material towards the central inlet as shown in FIG. 2. The correct screw thread required and roller rotation resulting in a desired direction of movement for crop material in relation to the auger screws will be apparent to those skilled in the art. By way of example, as viewed from the perspective of FIG. 1, lower roller 13 must rotate in a clockwise direction, while upper roller 14 must rotate in a counter clockwise direction in order to assist in pushing/directing crop material into the baler, as generally denoted by dotted arrow C in FIG. 1.

Figure 4:
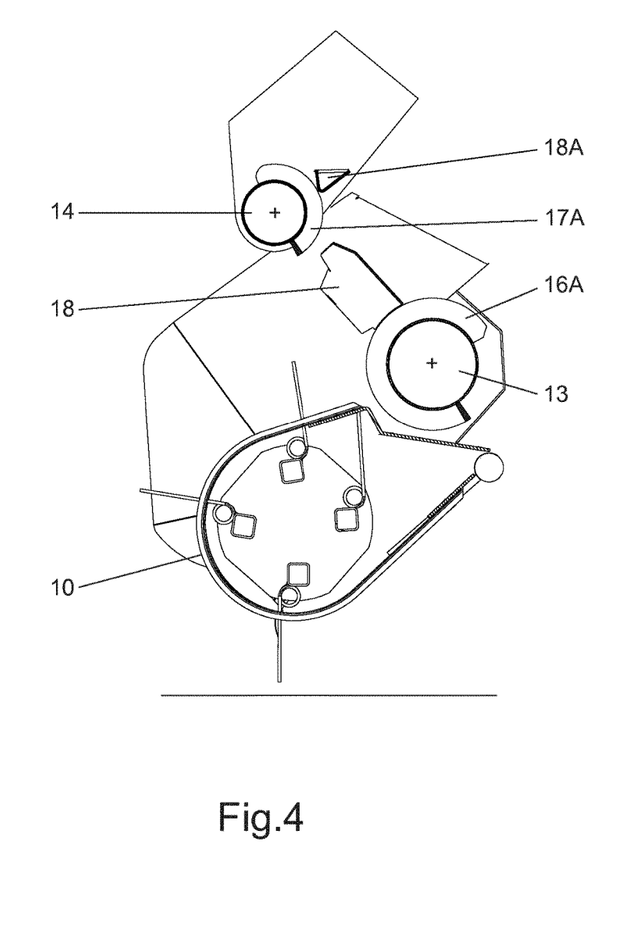
FIG. 4 illustrates a side elevation section view where retainer plates are visible.
Figure 5:
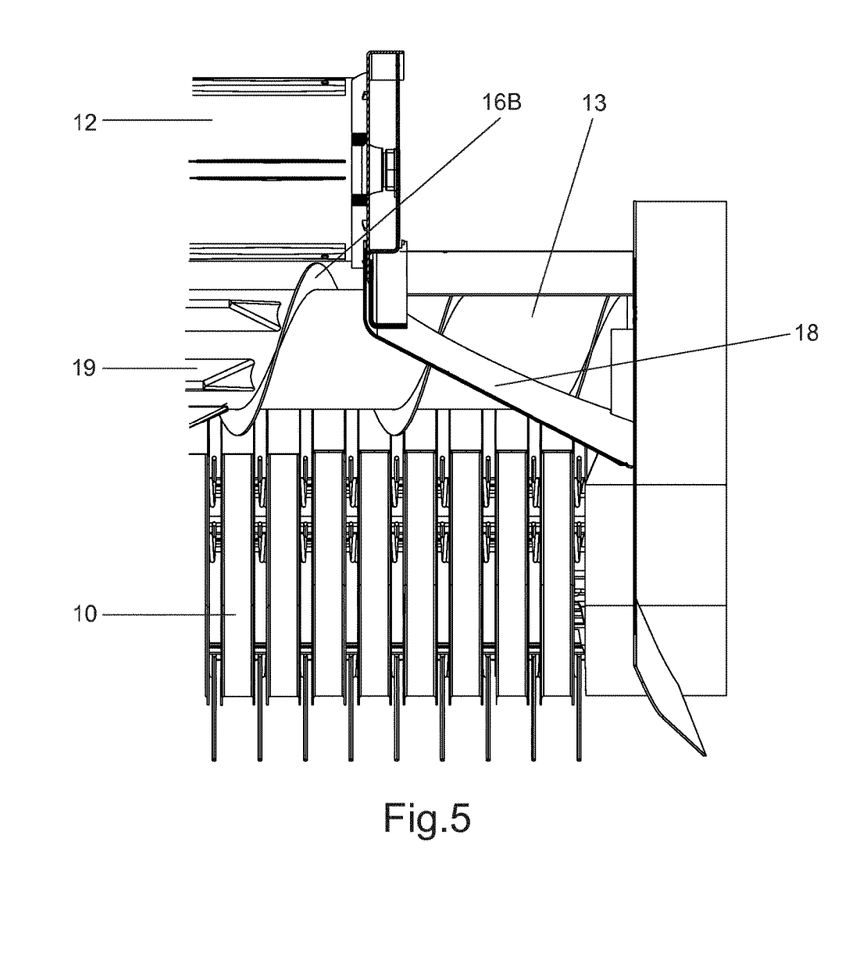
FIG. 5 illustrates a partial plan section view, of a lower roller and corresponding retainer plate.

As illustrated, the pickup feeder of the invention further includes a retainer plate in the form of inwardly tapered deflector panels 18 associated with auger portions 16A/16B on each side of roller 13 to create a funnel surface between an outside edge of the pickup unit 10 toward the infeed roller 12. The main purpose of a retainer plate is to cooperate with the flightings in order to assist transportation of material inwardly. As best seen in FIGS. 4 and 5, the retainer plate(s) 18 are mounted approximately directing towards the center of the roller and preferably approximately perpendicular to the flighting angle in order to prevent material from rotating around with the roller flighting. Because the roller flighting is rotating underneath the retained/blocked material the flighting is "screwing" the material along substantially the lower part of the retainer plate transversely towards the inlet of the baler (16B in FIG. 5).

Along the way crop material will contact at least the auger surfaces 16A/16B of the lower roller 13 which further ensures that the inlet feed is suitably reduced in width by the time it reaches the baler inlet 11. As seen in FIGS. 1 and 4, a separate retainer plate 18A is provided substantial parallel to roller 14 and downstream of the rotating direction of roller 14 to cooperate with the auger flightings similarly as described above. As seen in FIG. 4, retainer plate 18A being located behind roller 14 also can help to scrape off material (e.g. where there are no fligthings on the roller), depositing it past the lower retainer plate 18 so that it continues into the baler and is not merely rotated continuously around with the upper roller 14.

As best seen in the view of FIG. 2, auger portions 16A and 16B of the lower roller 13 preferably extend substantially from the outermost ends to a location which overlaps partly with the width of the inlet (e.g. infeed roller 12). This is clarified by the "dimension" lines shown in FIG. 2. In this way, crop material that is urged by the auger portions sideways toward the inlet can be urged partly beyond the edges of roller 12 to assist uniform distribution and consistent density during forming of the bale.

Crop material that enters directly without a change in direction to the inlet from the pickup unit 10 first encounters a ribbed or otherwise gripping surface 19 upon a central inboard portion of roller 13. The ribs 19 generally extend radially and longitudinally over the roller surface to assist material toward inlet 11.

Second roller 14 includes a similar overlap 17A/17B of the auger portions into the "inlet zone" 11 defined by roller 12. In the illustrated form, the auger portions 17A/17B overlap further into the inlet 11 than auger portions 16A/16B of roller 13, however, other configurations can be considered. For example, it is noteworthy that auger surfaces could be provided on the substantive surface of a roller, so long as auger flighting is present on the portion coinciding with the outside edge of the pickup unit. Roller 14 also features a series of radial ribs 20 which assist movement and compression of crop material toward the inlet. In general it is envisaged that the longitudinal coverage of ribs 19, 20 over its respective roller 13/14 will be at least half but preferably two-thirds of the central portion of the inlet width, where the auger flighting takes up the remaining space at each end.

In other embodiments ribs could be replaced or complemented by pins or teeth or other types of protrusion. In some forms these may cooperate with stripper elements similar to those of a pick up.

A particular significance of these ribs 19, 20 is that conventional open throat machines lack devices to force the material into the baling chamber, whereas non-open throat machines do have suitable forcing arrangements. Such force filling, especially with large volumes, is required to enable the baler to function well. The inboard rollers 13/14, especially with ribs 19/20, will force material into the baling chamber and hence imitate a forced intake unit on an open throat machine. It is advantageous to compress material inwardly via the gripping ribs on lower and upper rollers.

In a modified embodiment one of the rollers may be suspended under spring tension, thus force feeding could be further increased.

During use, at low or normal volumes, it is expected that crop material will be picked up by the tines of a conventional pickup unit 10 and conveyed toward the baler inlet 11, where it will first encounter roller 13, either at the outer edges where auger portion 16A/16B are located, or in the centre portion where ribs 19 are located. As will be apparent, in combination with retainer plate 18, auger portions 16A and 16B urge crop material towards a centreline of the baler inlet 11 where compression and further processing by roller 12 results in a relatively uniform bale produced within the baler apparatus in the known way.

In the event of a large volume of crop material being introduced, it is envisaged that the material will build up against roller 13 and retainer 18 until it reaches roller 14 located above and offset forward thereof. Once engaged by contact, roller 14 acts in a similar way to the first roller in that auger portions 17A/17B and retainer 18A urge crop material towards the centre of the inlet and, furthermore, a gripping surface 20 in the central portion of roller 14 aids compression and forwarding force of material entering the baler as described above. Opening 15, between the respective rollers 13/14, provides ample space for crop material to pass therethrough.

According to the construction of the invention as illustrated, the bigger the volume of incoming crop material, the bigger the influence of the upper auger on the flow and the more the material will be pushed towards a middle portion of the inlet; not only deposited at the side of the inlet, which would lead to bad shaped bales.

The height dimension of opening 15 is most preferably at least a half, but preferably one whole, diameter of a roller or roller+auger flighting in distance, generally greater than about 20 or 30 cm. However, the rollers 13/14 can be different diameters, which are in fact shown in FIG. 1. Furthermore, the pitch and height of the auger flighting can be varied dependent on which roller it is applied to, as can the respective speed of rotation of each roller.

It is envisaged that the dimension of gap 15 could be adjusted by an operator before commencing use of the machine, according to guidance established for a particular material. For example: If baling voluminous material, set to 25 cm". The gap setting remains fixed until the machine is stopped and adjusted for use on another material. In any event the respective axes of rotation for the upper and lower roller must be parallel such that the distribution of material is even. If the respective axes were skewed/tilted then this would lead to a greater density on one side of the bale which is undesirable.

Preferably, as each section of auger flighting is provided with a retainer plate to cooperate and assist in urging material in the appropriate direction, build up of material is avoided. Overall, the controlled funnel effect of the feeder for a baler according to the invention minimises the risk of misshapen or density-variable bales and, furthermore, is less prone to blockage because the inlet is able to receive and forward large volumes.

It will be apparent that a number of modifications could be incorporated into the pickup feeder without departing from the scope of the invention as defined by the appended claims. Preferably, the lower and upper rollers are spaced apart such there is at least a half diameter of a roller as free space, however, a number of intermediate positions and beyond are possible, particularly if one or both of the rollers are configured to be adjustable according to user settings. Furthermore, it is not essential that a flighting is present on both the lower and upper roller. Configurations may be possible where the upper roller does not have a flighting as even a plain roller is able to provide the required compressive force against the lower roller where the flighting of that roller provides the overall urging-towards-centre function of the device.

The invention claimed is:

1. An open throat intake for a baler, comprising:
 a pickup to pick up crop material from the ground and supply it to a baler inlet, wherein the pickup is wider than at least one side of the baler inlet;
 a lower roller downstream of the pickup and extending across the baler inlet;
 an upper roller extending across the baler inlet and located above the lower roller;
 the lower roller including auger flighting on portions coinciding with an outward side of the pickup;
 the upper roller including auger flighting at outward ends thereof coinciding with the outward side of the pickup;
 the auger flighting of either or both of the lower and upper rollers overlapping with an outside edge of the baler inlet; and
 a retainer plate mounted to a housing of the lower roller and across at least a part of the auger flighting of the lower roller, said retainer plate extending approximately perpendicularly from the auger flighting of the lower roller toward the upper roller and tapered inwardly toward a center of the baler inlet to direct the crop material in an axial direction, wherein the retainer plate is located between the upper and lower rollers to provide a clearance from the upper roller.

2. The open throat intake according to claim 1 wherein the upper roller is spaced apart from the lower roller such that, at least, the auger flightings on the respective roller surfaces, above and below, do not overlap with one another, when viewed in an axial direction of the rollers.

3. The open throat intake according to claim 2 wherein the spacing between rollers is axially fixed but, when not in use, operator-adjustable for adaptation to different materials.

4. The open throat intake according to claim 2 wherein the lower and upper rollers are spaced apart by at least half the diameter of one of the rollers so as to provide sufficient free space for an opening therebetween.

5. The open throat intake according to claim 4 wherein the lower and upper rollers are spaced apart by at least a whole diameter of one of the rollers.

6. The open throat intake according to claim 2 wherein the lower and upper rollers are spaced apart by between 15 and 30 cm.

7. The open throat intake according to claim 1 wherein the upper roller is forwardly offset from the lower roller, relative to a direction of travel of the baler.

8. The open throat intake according to claim 1 including at least one downstream retainer plate associated with the auger flighting downstream of one or both of the lower and upper rollers.

9. The open throat intake according to claim 1 wherein the lower and upper rollers rotate in contrary directions to draw material toward the baler inlet.

10. The open throat intake according to claim 1 wherein the upper roller is mounted from a frame of the baler.

11. The open throat intake according to claim 1 wherein the lower roller is mounted to a common mounting with the pickup.

12. A baler comprising a bale forming chamber to form cylindrical bales of varying size, an inlet and an open throat intake according to claim 1.

13. The open throat intake according to claim 8 wherein the at least one downstream retainer plate is substantially parallel to the rotation axis of a cooperating roller.

14. The open throat intake according to claim 8 wherein the at least one downstream retainer plate is associated with the upper roller downstream of the auger flighting positioned to, in use, scrape off crop material and deposit the scraped off crop material past said retainer plate of the lower roller so the crop material continues into the baler.

15. The open throat intake according to claim 1 wherein one or both of the lower and upper rollers includes an inboard gripping surface.

16. The open throat intake according to claim 15 wherein the inboard gripping surface extends to at least half of the width of the baler inlet.

17. The open throat intake according to claim 15 wherein the inboard gripping surface comprises at least one of longitudinal ribs, spikes, and other radial-protrusions.

* * * * *